Sept. 15, 1959  R. RAJAN  2,904,358
SECURING PLASTIC PULLEYS ON THEIR JOURNALS OR SHAFTS
Filed Feb. 7, 1958
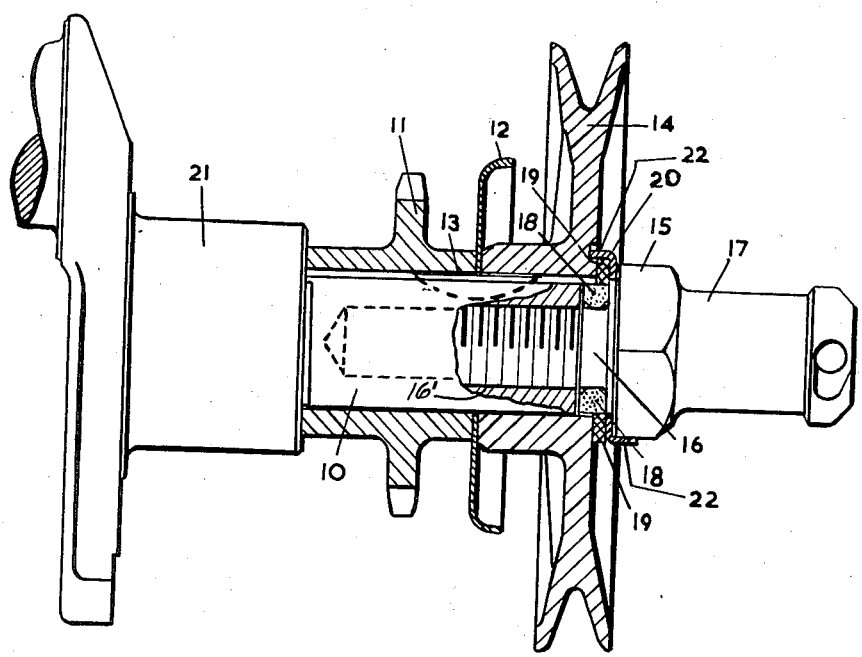
Inventor
Ramon Rajan
By Scrivener and Parker,
Attorneys

United States Patent Office 2,904,358
Patented Sept. 15, 1959

2,904,358

SECURING PLASTIC PULLEYS ON THEIR JOURNALS OR SHAFTS

Ramon Rajan, Malbrook, England, assignor to The Austin Motor Company Limited, Northfield, England Application February 7, 1958, Serial No. 713,908

Claims priority, application Great Britain March 22, 1957

2 Claims. (Cl. 287—53)

This invention relates to the securing upon their journals or shafts pulleys of plastic material such, for example, as that known under the trademark "Bakelite." More particularly the invention is concerned with the securing of plastic driving pulleys on the end of an engine crankshaft of a motor road vehicle.

Usually a pulley on the forward end of an engine crankshaft is secured by means of a so-called "starting nut" which is in the form of a bolt with a rearward shank for screwing into a tapped axial bore in the shaft end and with a forward shank for engagement by the starting handle, the portion intermediate said shanks having the external form of a nut to facilitate tightening up with a spanner or key. The pulley is slidably splined or keyed on the shaft end and is clamped against an annular abutment or locating shoulder by means of the starting nut and a metal washer interposed between the nut part and the forward end of the pulley boss, but it is found that the clamping pressure required to secure the starting nut in the correct position on the shaft end subjects the centre boss or hub of the pulley to an axial compressive load which would be more than could be withstood if it were made of hard and somewhat brittle plastic material and consequently, the pulley boss or hub, if of such material, would crack especially in the vicinity of the keyway where the radial thickness of said boss or hub is reduced somewhat.

An obvious way of overcoming this difficulty would be to make the pulley of a less brittle and tougher plastic material, such for example, as nylon, but unfortunately the tougher thermo plastics are much more expensive and, moreover, are subject to "cold-flow" and distortion under high pressures.

According to the present invention, a plastic pulley is drivingly keyed to its shaft and is secured thereon against an annular abutment or locating shoulder by a clamping nut having a shank screwing into a tapped axial bore in the end of said shaft, said shank carrying a spacer ring of sintered metal which enters the outer end of the pulley bore and is compressed between the end face of the shaft and a confronting annular face on the clamping bolt, and also, encircling said spacer ring, a washer of nylon or other appropriate compressible material somewhat softer or more readily compressible than that of the pulley, which washer is compressed against the outer end face of the pulley hub or boss by the clamping bolt. In the latter connection the compressible washer may be engaged directly by the confronting face of the clamping bolt or by an associated metal washer interposed between these parts.

The invention will now be described with reference to the accompanying drawing which shows, in sectional side elevation, its application to the mounting of a fan-belt or like pulley of hard plastic material upon an engine crankshaft.

Referring to the drawing, 10 indicates the forward end of the engine crankshaft; 11 is a timing chain sprocket; 12 is a dished or marginally flanged disc for enclosing or shrouding an oil seal (not shown); 13 is a key; 14 is a belt pulley of hard plastic material. The pulley 14, the disc 12 and the sprocket 11 are slidable and drivingly keyed upon the forward end 10 of the crankshaft by means of the key 13 which engages a locating groove in the crankshaft and registering axial keyways in the pulley 14, disc 12 and sprocket 11.

The so called "starting nut" or clamping bolt 15 has a rearward shank 16 screwing into a tapped axial bore 16' in the shaft end portion 10 and a forward shank 17 for engagement by the starting handle, the intermediate portion, to which the reference 15 is applied, having the external form of a nut to facilitate tightening up with a spanner or key.

The over-all axial length of the centre portions or hubs of the slidably keyed parts 11, 12 and 14 which are mounted in tandem upon the shaft end 10 is somewhat greater than the length of the latter, and the shank 16 of the starting nut 15 carries a spacer ring 18 of sintered metal which enters the outer end of the pulley bore and also, encircling the said spacer ring 18, a washer 19 of nylon or other appropriate compressible material, whilst a metal locking washer 20 is interposed between the nut part 15 and said compressible washer 19.

When the tandem assembly on the crankshaft end portion 10 is clamped up by the bolt 15, the rearmost end of the boss of the sprocket 11 abuts a forwardly presented annular shoulder afforded at the junction of said shaft end portion 10 with an adjacent main journal portion 21, and the disc 12 is gripped between the confronting end of said sprocket boss and the rearmost end of the boss of the pulley 14, so that these axially aligned parts afford annular abutments or locating shoulders one for another in series, whilst the washer 19 is compressed between the outer end face of the hub or boss of the pulley 14 and the metal washer 20, which is backed by the starting nut part 15, and the spacer ring 18 is compressed axially under the clamping pressure and also expanded radially somewhat within the nylon or other washer 19.

Since the material of which the washer 19 is made is somewhat softer or more readily compressible than that of which the pulley 14 is made, said washer 19, in yielding a little under the clamping pressure relieves the pulley boss or hub of some of the axial loading to which it would otherwise be subjected whilst, at the same time, serving to retain the pulley 14 against axial movement on the shaft.

The locking washer 20 has diametrically opposed lugs 22 one of which is engaged with a recess in the forward face of the pulley 14 and the other of which, after the clamping-up operation, is turned forwardly into engagement with one of the side faces of the nut part 15, as shown, to secure the so called "starting nut" against slackening-off.

Having fully described my invention, what I claim and desire to secure by Letters Patent is:

1. In combination with a rotatable shaft having a free end containing a tapped axial bore and a shoulder spaced inwardly of said bore, a pulley having a hub portion containing an axial bore therethrough, said hub received on and drivingly keyed to said shaft with one side of said hub in abutting relationship with said shoulder and the other side of said hub projecting slightly over the free end of said shaft, means for securing said pulley to said shaft comprising a bolt having a nut part and a threaded shank received in the bore in said shaft, a spacer of sintered metal received in the bore of the projecting part of said hub and in abutting relationship with the free end of said shaft, said spacer extending axially outwardly a distance slightly greater than the projecting part of said hub, and a washer of a material having greater compressibility than said pulley encircling an outermost axially extending portion of said spacer and abutting the outer end of the extending portion of the hub of said pulley, said washer being compressed between said nut part and said outer end of the pulley hub as said bolt is screwed into the axial bore in said shaft.

2. The combination of claim 1 including a metal washer interposed between said compressible washer and said nut part.

References Cited in the file of this patent

UNITED STATES PATENTS

| | | |
|---|---|---|
| 1,162,970 | Binfard | Dec. 7, 1915 |
| 1,713,096 | Schott | May 14, 1929 |
| 2,154,971 | Bruni | Apr. 18, 1939 |
| 2,730,387 | White | Jan. 10, 1956 |